(12) United States Patent
Wu et al.

(10) Patent No.: US 10,468,973 B2
(45) Date of Patent: Nov. 5, 2019

(54) OVER CURRENT PROTECTING CIRCUIT AND THE METHOD THEREOF

(71) Applicant: Chengdu Monolithic Power Systems Co., Ltd., Chengdu (CN)

(72) Inventors: Xiaokang Wu, Hangzhou (CN); Qian Ouyang, Hangzhou (CN); Yu Zhang, Hangzhou (CN); Xiaogang Wei, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 16/103,846

(22) Filed: Aug. 14, 2018

(65) Prior Publication Data

US 2019/0068049 A1 Feb. 28, 2019

(30) Foreign Application Priority Data

Aug. 28, 2017 (CN) .......................... 2017 1 0747806

(51) Int. Cl.
*H02M 1/32* (2007.01)
*H02M 3/156* (2006.01)
*H02M 1/08* (2006.01)
*H02M 1/00* (2006.01)

(52) U.S. Cl.
CPC .............. *H02M 1/32* (2013.01); *H02M 1/08* (2013.01); *H02M 3/156* (2013.01); *H02M 2001/0009* (2013.01); *H02M 2001/0025* (2013.01)

(58) Field of Classification Search
CPC .......... H02M 1/32; H02M 1/08; H02M 3/156; H02M 2001/0009; H02M 2001/0025
See application file for complete search history.

(56) References Cited

U.S. PATENT DOCUMENTS

| | | | |
|---|---|---|---|
| 9,385,617 B2* | 7/2016 | Hosotani | ................. H02M 1/32 |
| 2007/0247085 A1 | 10/2007 | Yao et al. | |
| 2013/0300385 A1 | 11/2013 | Li et al. | |
| 2014/0022684 A1 | 1/2014 | Jiang et al. | |
| 2016/0380537 A1* | 12/2016 | Bizjak | .................. H02M 3/156 |
| | | | 323/271 |
| 2017/0170655 A1 | 6/2017 | Nguyen et al. | |

* cited by examiner

*Primary Examiner* — Yusef A Ahmed
*Assistant Examiner* — Jye-June Lee
(74) *Attorney, Agent, or Firm* — Perkins Coie LLP

(57) ABSTRACT

An over current protecting circuit, used with a switching converter having a switch, having: a current limiting circuit, configured to receive a limit indicating signal and to provide an on time signal to control an on time period of the switch based on the limit indicating signal, wherein if the limit indicating signal indicates a current flowing through the switch of the switching converter is larger than a limiting threshold, the on time period of a next switching cycle of the switch is subtracted with a first period, otherwise, the on time period of the switch of the next switching cycle is added with a second period; wherein a maximum on time period of the switch is fixed to be an on time reference.

15 Claims, 5 Drawing Sheets

OVER CURRENT PROTECTING CIRCUIT AND THE METHOD THEREOF

CROSS-REFERENCE TO RELATED APPLICATIONS

This application claims priority to and the benefit of Chinese Patent Application No. 201710747806.0, filed on Aug. 28, 2017, which is incorporated herein by reference in its entirety.

FIELD

The present invention relates generally to electronic circuits, and more particularly but not exclusively to over current protecting strategy in electronic circuits.

BACKGROUND

Switching converters are widely adopted to provide a regulated voltage and/or a regulated current to electronic devices. To maintain the normal operation of the switching converter, and further to protect the pre-stage circuit and the post-stage circuit of the switching converter, protection mechanisms, e.g., over current protection, over voltage protection, thermal protection, are needed. An over current protecting circuit is usually integrated to electronic devices to prevent current shoot-through. In real applications, different over current protecting strategies are adopted to realize diversified requirements.

SUMMARY

The present invention provides a simple and reliable over current protecting strategy realized in a digital way.

There has been provided, in accordance with an embodiment of the present invention, an over current protecting circuit, used with a switching converter having a switch, comprising: a current limiting circuit, configured to receive a limit indicating signal and to provide an on time signal to control an on time period of the switch based on the limit indicating signal, wherein if the limit indicating signal indicates a current flowing through the switch of the switching converter is larger than a limiting threshold, the on time period of the switch of a next switching cycle is decreased with a first period compared to the on time period of the switch of a current switching cycle, otherwise, the on time period of the switch of the next switching cycle is increased with a second period; and wherein a maximum on time period of the switch is fixed to be an on time reference.

There has been provided, in accordance with an embodiment of the present invention, a switching converter, converting power by turning on and off a switch, comprising: a comparing circuit, configured to receive a reference signal and a feedback signal indicative of an output power of the switching converter, and to generate a comparing signal based on a comparison result of the feedback signal and the reference signal; an on time regulator, configured to receive the comparing signal and a switching control signal turning on and off the switch, and to provide an on time regulating signal based on a comparison result of the switching control signal and the comparing signal; and an over current protecting circuit having a current limiting circuit configured to receive a limit indicating signal and to provide an on time signal to control an on time period of the switch based on the limit indicating signal, wherein if the limit indicating signal indicates a current flowing through the switch of the switching converter is larger than a limiting threshold, the on time period of the switch of a next switching cycle is decreased with a first period compared to the on time period of the switch of a current switching cycle, otherwise, the on time period of the switch of the next switching cycle is increased with a second period; wherein the on time regulating signal is added to the on time signal of the next switching cycle to control the on time period of the switch; and wherein a maximum on time period of the switch is fixed to be an on time reference.

There has been provided, in accordance with an embodiment of the present invention, an over current protecting method used with a switching converter having a power device, the method comprising: decreasing an on time period of the power device of a current switching cycle by a first period to preset the on time period of the power device for a next switching cycle when a current flowing through the power device is larger than a limiting threshold; increasing the on time period of the power device of the current switching cycle by a second period to preset the on time period of the power device for the next switching cycle when the current flowing through the power device is lower than the limiting threshold; and setting a maximum on time period of the power device in each switching cycle be an on time reference.

The use of the same reference label in different drawings indicates the same or like components.

DETAILED DESCRIPTION

In the present invention, numerous specific details are provided, such as examples of circuits, components, and methods, to provide a thorough understanding of embodiments of the technology. Persons of ordinary skill in the art will recognize, however, that the technology can be practiced without one or more of the specific details. In other instances, well-known details are not shown or described to avoid obscuring aspects of the technology.

Figure 1:
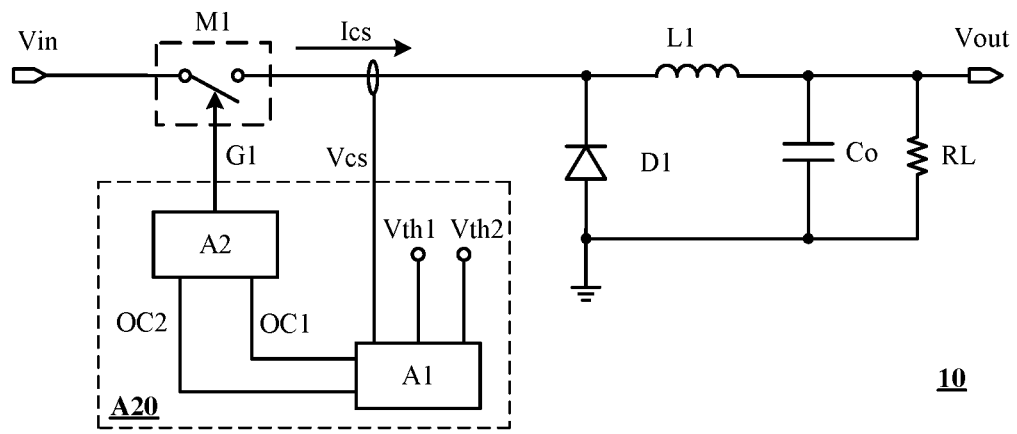
FIG. 1 schematically shows a block diagram of a buck converter 10 in accordance with an embodiment of the present invention.

The present invention is illustrated with an example of a non-synchronous buck converter. FIG. 1 schematically shows a block diagram of a non-synchronous buck converter 10 in accordance with an embodiment of the present invention. The buck converter 10 comprises a switch M1, a diode D1, an inductor L1, an output capacitor Co and a load represented by a resistor RL coupled as shown in FIG. 1. The buck converter 10 transfers power from an input terminal to an output terminal by alternately turning on and off the switch M1 and the diode D1, and converts an input voltage Vin to an output voltage Vout. Thus, the switch M1 has switching cycles, wherein each switching cycle comprises an on time period and an off time period.

During the operation, current may overflow through the switch M1 and the inductor L1 due to load variation, circuit failure, etc. To prevent over current flowing through the switch M1, the present invention provides an over current protecting circuit A20 comprising a current sensing circuit A1 and a current limiting circuit A2. In FIG. 1, the current flowing through the switch M1 and the inductor L1 is represented by a current sense signal Vcs which is provided to the current sensing circuit A1. The current sensing circuit A1 compares the current sense signal Vcs with a blocking threshold Vth1 and with a limiting threshold Vth2, and generates a block indicating signal OC1 and a limit indicating signal OC2 based on the comparison result. In one embodiment, when the current sense signal Vcs is larger than the blocking threshold Vth1, the block indicating signal OC1 is valid, otherwise, the block indicating signal OC1 is invalid; and when the current sense signal Vcs is larger than the limiting threshold Vth2, the limit indicating signal OC2 is valid, otherwise, the limit indicating signal OC2 is invalid. In one embodiment, the blocking threshold Vth1 is larger than the limiting threshold Vth2. The valid states of the block indicating signal OC1 and the limit indicating signal OC2 may be represented by pulses, high voltage level, rising edge or falling edge of signals according to the different application requirements. Furthermore, the block indicating signal OC1 has priority over the limit indicating signal OC2.

Figure 2:
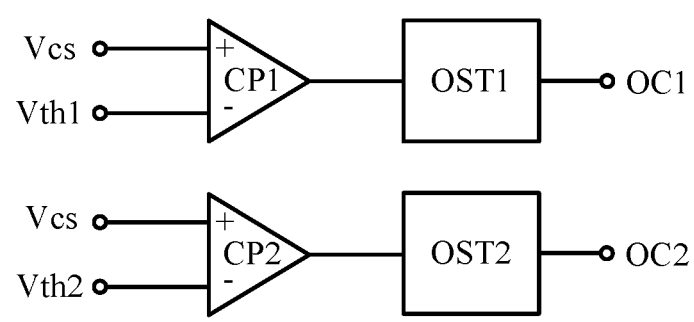
FIG. 2 schematically shows a current sense circuit A1 in accordance with an embodiment of the present invention.

FIG. 2 schematically shows a current sense circuit A1 in accordance with an embodiment of the present invention. In the example of FIG. 2, the current sense circuit A1 comprises comparators CP1, CP2, and one-shot circuits OST1, OST2. The comparator CP1 has a non-inverting input terminal configured to receive the current sense signal Vcs, and an inverting input terminal configured to receive the blocking threshold Vth1. When the current sense signal Vcs increases to be larger than the blocking threshold Vth1, the comparator CP1 generates a high level voltage signal to the one-shot circuit OST1, and the block indicating signal OC1 generated by the one-shot circuit OST1 has a pulse then. The comparator CP2 has a non-inverting input terminal configured to receive the current sense signal Vcs, and an inverting input terminal configured to receive the limiting threshold Vth2. When the current sense signal Vcs increases to be larger than the limiting threshold Vth2, the comparator CP2 generates a high level voltage signal to the one-shot circuit OST2, and the limit indicating signal OC2 generated by the one-shot circuit OST2 has a pulse then. In the example of FIG. 2, the valid states of the block indicating signal OC1 and the limit indicating signal OC2 are represented by pulses.

Figure 3:
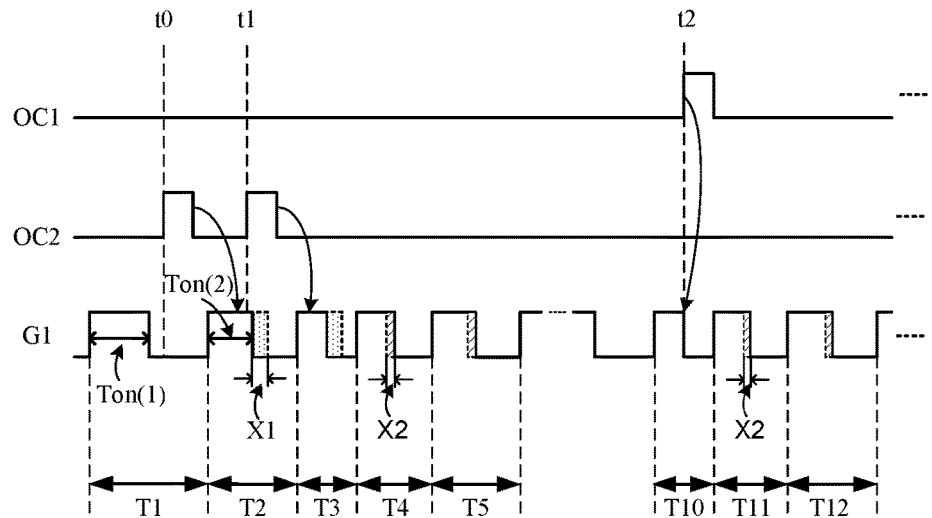
FIG. 3 schematically shows waveforms of the block indicating signal OC1, the limit indicating signal OC2 and the switching control signal G1.

FIG. 3 schematically shows waveforms of the block indicating signal OC1, the limit indicating signal OC2 and the switching control signal G1. The operation of the over current protecting circuit A20 is described with reference to FIGS. 1 and 3.

At time t0 in the switching cycle T1, the current sense signal Vcs increases to the limiting threshold Vth2, and invokes a pulse of the limit indicating signal OC2. The current limiting circuit A2 receives the pulse of the limit indicating signal OC2, and decreases a preset on time period Ton of the next switching cycle T2 by a first period X1, i.e., Ton(2)=Ton(1)−X1, wherein the on time period Ton corresponds to an on time period of the switch M1 during a switching cycle. At time t1 in the switching cycle T2, the limit indicating signal OC2 continues to have a pulse, indicating that the current sense signal Vcs is still larger than the limiting threshold Vth2. As a result, the current limiting circuit A2 decreases the preset on time period Ton of the next switching cycle T3 by the first period X1 again, i.e., Ton(3)=Ton(2)−X1. In other words, the preset on time period Ton(n+1) of the next switching cycle equals to the on time period Ton(n) of the current switching cycle minus the first period X1 if a pulse of the limit indicating signal OC2 is detected in the current switching cycle, i.e., Ton(n+1)=Ton(n)−X1, wherein n is a natural number. Once the limit indicating signal OC2 stops pulsing, i.e., the over current status of the switch M1 is over, the preset on time period Ton(n+1) of the next switching cycle equals to the on time period Ton(n) of the current switching cycle added with a second period X2. For example, in the switching cycle T3, no pulse of the limit indicating signal OC2 is detected. As a result, the on time period Ton(4) of the switch M1 during the switching cycle T4 is increased with the second period X2, i.e., Ton(4)=Ton(3)+X2. In other words, the preset on time period Ton(n+1) of the next switching cycle equals to the on time period Ton(n) of the current switching cycle plus the second period X2 if no pulse of the limit indicating signal OC2 is detected in the current switching cycle, i.e., Ton(n+1)=Ton(n)+X2. Meanwhile, the maximum on time period Ton is fixed to an on time reference Tp in each switching cycle, which means once the on time period Ton of the next switching cycle reaches the preset on time reference Tp, the on time reference Tp is provided to be the on time period of the next switching cycle.

During the switching cycle T10 as shown in FIG. 3, the block indicating signal OC1 has a pulse at time t2, indicating that the current sense signal Vcs reaches the blocking threshold Vth1. The current limiting circuit A2 receives the block indicating signal OC1, and generates the switching control signal G1 to turn off the switch M1. Furthermore, the current limiting circuit A2 records the on time period Ton(10) of the switch M1, and sets the on time period of the switch M1 of the next switching cycle, i.e., the switching cycle T11, be Ton(11)=Ton(10)+X2. If no pulse of the block indicating signal OC1 or the limit indicating signal OC2 is detected during the switching cycle T11, the on time period Ton(11) would be Ton(10)+X2. Then, compared to previous switching cycles, the on time period Ton of the switch M1 in each switching cycle would be added with the second period X2, i.e., Ton(n+1)=Ton(n)+X2, until it reaches the on time reference Tp.

In one embodiment, the first period X1 is larger than the second period X2.

Figure 4:
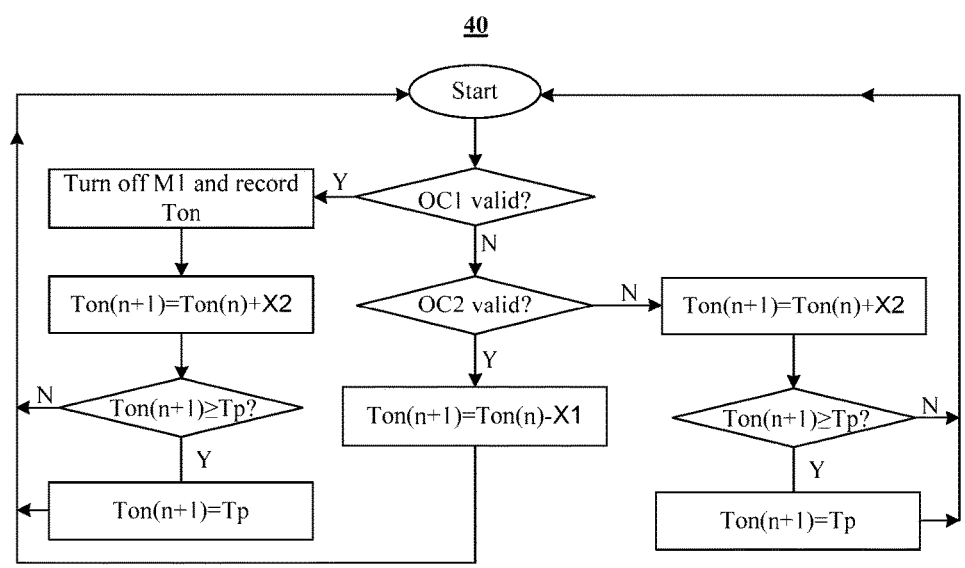
FIG. 4 shows a method 40 of over current protecting in a switching converter in accordance with an embodiment of the present invention.

FIG. 4 shows an over current protection method 40 in a switching converter in accordance with an embodiment of the present invention. The method 40 may be applied to the buck converter 10 shown in FIG. 1. The method 40 comprises: in n-th switching cycle, comparing a current flowing through a power device of the switching converter, e.g., the switch M1, with a blocking threshold Vth1 to generate a block indicating signal OC1, and comparing the current flowing through the power device with a limiting threshold Vth2 to generate a limit indicating signal OC2; turning off the power device when the block indicating signal OC1 is valid, which indicates that the current flowing through the power device increases to the blocking threshold Vth1, meanwhile, setting the on time period Ton(n+1) of the power device be Ton(n+1)=Ton(n)+X2, wherein X2 is a second period; setting the on time period Ton(n+1) of the power device be Ton(n+1)=Ton(n)−X1 when the block indicating signal OC1 is invalid and the limit indicating signal OC2 is valid, which indicates that the current flowing through the power device is larger than the limiting threshold Vth2 but is still lower than the blocking threshold Vth1; setting the on time period Ton(n+1) of the power device be Ton(n+1)=Ton(n)+X2 when both of the block indicating signal OC1 and the limit indicating signal OC2 are invalid, which means the current flowing through the power device is lower than both the blocking threshold Vth1 and the limiting threshold Vth2; and setting a maximum on time period Ton of the power device be an on time reference Tp.

In one embodiment, the block indicating signal OC1 has priority over the limit indicating signal OC2. Once the block indicating signal OC1 is valid, the power device will be turned off despite the state of the limit indicating signal OC2, and the on time period Ton(n+1) of the next switching cycle will be Ton(n+1)=Ton(n)+X2.

Figure 5:
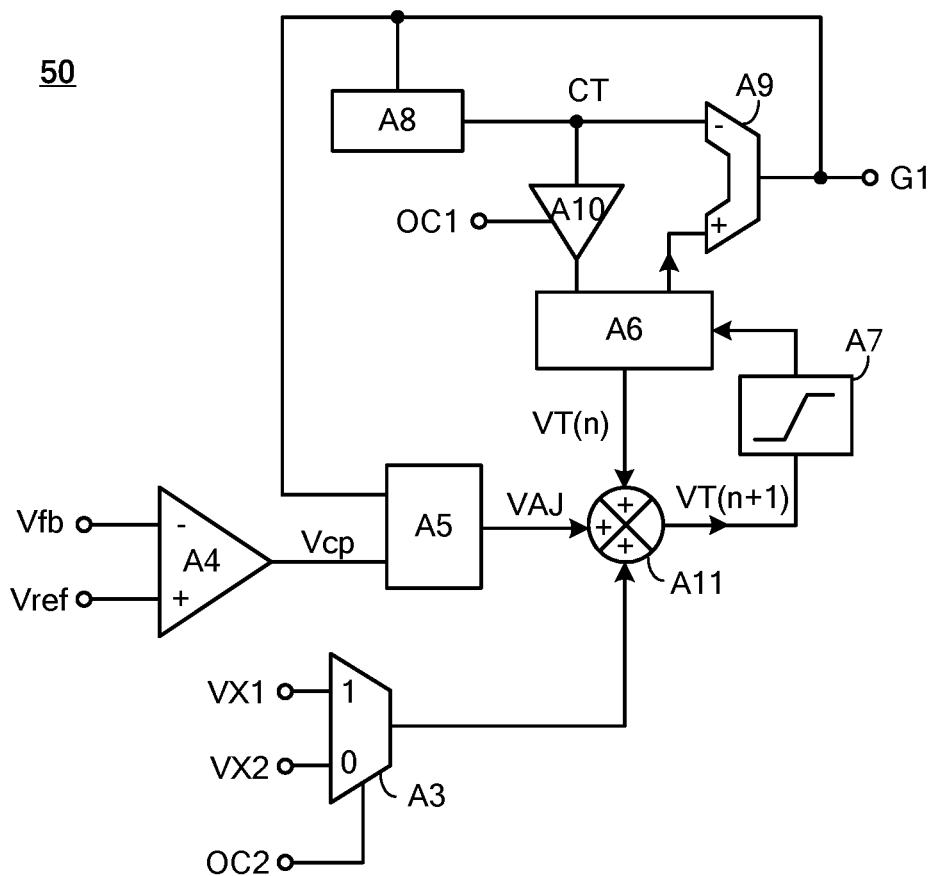
FIG. 5 schematically shows a current limiting circuit 50 in accordance with an embodiment of the present invention.

FIG. 5 schematically shows a current limiting circuit 50 in accordance with an embodiment of the present invention. The current limiting circuit 50 may be used with the switching converters, e.g., the buck converter 10 in FIG. 1. As shown in FIG. 5, the current limiting circuit 50 comprises: a selecting circuit A3, configured to receive a first period signal VX1, a second period signal VX2 and the limit indicating signal OC2, and to provide the first period signal VX1 when the limit indicating signal OC2 is valid, and to provide the second period signal VX2 when the limit indicating signal OC2 is invalid; a timing circuit A8 configured to receive the switching control signal G1, and to provide a timing signal CT, wherein the timing signal CT is reset and begins timing from an initial value at the moment the switching control signal G1 turns on the switch M1; a summing circuit A11, configured to receive an on time signal VT(n) of the current switching cycle and the output signal of the selecting circuit A3, and to provide the summing result, i.e., a preset on time signal VT(n+1) of the next switching cycle; a clamping circuit A7 configured to receive the preset on time signal VT(n+1) of the next switching cycle provided by the summing circuit A11, and to provide the on time signal VT(n+1) of the next switching cycle when the on time period Ton(n+1) is lower than an on time reference Tp, and to provide the on time reference signal VTp when the on time period Ton(n+1) is larger than or equal to the on time reference Tp; a register A6, configured to receive and update the on time signal VT in each switching cycle; a sampling circuit A10, configured to receive the timing signal CT and the block indicating signal OC1, and to provide the timing signal CT to the register A6 as the on time signal of the current switching cycle when the block indicating signal OC1 is valid; and a digital comparator A9, configured to receive the timing signal CT, and to provide the switching control signal G1 based on a comparison result of the timing signal CT and the on time signal VT stored in the register A6.

In one embodiment, when the system works in steady state, the register A6 provides the digitalized on time signal with constant value. The on time signal is compared with the timing signal CT. When the on time signal is larger than the timing signal CT, the switching control signal G1 has a high voltage level and turns on the switch M1; when the on time signal is lower than the timing signal CT, the switching control signal G1 has a low voltage level and turns off the switch M1. In one embodiment, the timing signal CT increases from the rising edge of the switching control signal G1 with a constant period. In this case, the lager the on time signal provided by the register A6, the longer the switching control signal G1 being high voltage level, and the longer the on time period of the switch M1; the smaller the on time signal provided by the register A6, the shorter the switching control signal G1 being high voltage level, and the shorter the on time period of the switch M1.

In FIG. 5, the register A6 stores and updates the on time signal VT based the output signal of the summing circuit A11 every switching cycle. Take the waveforms in FIG. 3 as an example, the register A6 updates the on time signal VT(1) before the switching cycle T1. The on time signal VT(1) contains the information of the on time period Ton(1) of the switching cycle T1, and is compared with the timing signal CT. The switching control signal G1 is generated based on the comparison result of the on time signal VT(1) and the timing signal CT. Under the control of the switching control signal G1, the switch M1 has the on time period Ton(1) during the switching cycle T1. When the limit indicating signal OC2 pulses during the switching cycle T1, the selecting circuit A3 provides the first period signal VX1 which is added to the on time signal VT(1) stored in the register A6 to set the on time signal VT(2) for the next switching cycle T2. The on time signal VT(2) contains information of the on time period Ton(2), and is compared with the timing signal CT to generate the switching control signal G1 which turns on the switch M1 for the on time period Ton(2)=Ton(1)−X1 in the switching cycle T2. In one embodiment, the first period signal VX1 has a negative value −X1, i.e., negative first period value. Furthermore, the on time period Ton(3) of the switch M1 in the switching cycle T3 is Ton(2)−X1 because the limit indicating signal OC2 pulses in the switching cycle T2. In the switching cycle T4, because the limit indicating signal OC2 has no pulse during the switching cycle T3, the second period signal VX2 is selected to be added to the on time signal VT(3), and then the signal stored in the register A6 is updated to be the on time signal VT(4), which contains information of the on time period Ton(4)=Ton(3)+X2. In one embodiment, the value of the second period signal VX2 is X2, and X2 is the second period value. In a similar way as shown in FIG. 3, the on time period Ton(5) is Ton(4)+X2 because there is no pulse of the limit indicating signal OC2 during the switching cycle T4.

Because the on time signal VT stored in the register A6 is adopted to decide the switching control signal in each switching cycle, the on time signal VT should be updated in advance. In the above descriptions, the on time signal VT(n+1) for the (n+1)-th switching cycle is updated in the n-th switching cycle or the beginning of the (n+1)-th switching cycle.

In one embodiment, the register A6 is refreshed, i.e., the on time signal VT is updated, at the beginning of the on time period of the switch M1 in each switching cycle. For example, the register A6 may be refreshed at the rising edge of the switching control signal G1.

In one embodiment, the register A6 is refreshed by the output signal of the clamping circuit A7 in real time.

The clamping circuit A7 receives the output signal of the summing circuit A11, and is configured to set the maximum on time period Ton. In one embodiment, when the preset on time period Ton(n+1) of the next switching cycle is lower than the on time reference Tp, the preset on time signal VT(n+1) is directly provided to update the register A6. When the preset on time period Ton(n+1) of the next switching cycle is higher than the on time reference Tp, the on time reference signal VTp is provided to update the register A6, i.e., the on time period of the switch M1 in the next switching cycle equals to the on time reference Tp.

The current limiting circuit 50 in FIG. 5 could be used with the switching converter, e.g., the buck converter 10 in FIG. 1. The switching converters may comprise a comparing circuit A4 and an on time regulator A5 as shown in FIG. 5. The comparing circuit A4 receives a feedback signal Vfb indicative of the output voltage Vout of the switching converter and a reference signal Vref, and generates a comparing signal Vcp based on the comparison result of the feedback signal Vfb and the reference signal Vref. The on time regulator A5 receive the switching control signal G1 and the comparing signal Vcp, and provides an on time regulating signal VAJ based the switching control signal G1 and the comparing signal Vcp, wherein when a rising edge of the comparing signal Vcp is earlier than a falling edge of the switching control signal G1, the on time regulating signal VAJ has a value of a third period X3; when the rising edge of the comparing signal Vcp happens at the same time with the falling edge of the switching control signal G1, the on time regulating signal VAJ has a value of zero; when the rising edge of the comparing signal Vcp is later than the falling edge of the switching control signal G1, the on time regulating signal VAJ has a value of a negative fourth period −X4; and wherein the on time regulating signal VAJ is provided to a summing circuit A11, and is added to the sum of the on time signal VT(n) and the output signal of the selecting circuit A3. In one embodiment, the reference signal Vref further comprises a slope component.

In one embodiment, the rising edge of the comparing signal Vcp indicates the value of the output voltage Vout. When the switching converter works in steady state: earlier rising edge of the comparing signal Vcp indicates a decrease of the output voltage Vout, in this case, the output voltage Vout is increased by increasing the on time period of the next switching cycle with the third period X3 provided by the on time regulator A5; a later rising edge of the comparing signal Vcp indicates an increase of the output voltage Vout, in this case, the output voltage Vout is decreased by decreasing the on time period of the next switching cycle with the fourth period value X4 provided by the on time regulator A5; the rising edge of the comparing signal Vcp and the falling edge of the switching control signal G1 happening at the same time indicates a stable output voltage Vout, and the on time period of the switch M1 keeps unchanged.

Persons of ordinary skill in the art would know that when the output voltage Vout replaced with the output current, i.e., the feedback signal Vfb indicates the output current of the switching converter, the above described method is applied too. The on time regulator A5 could be applied to regulate the output current of the system by adjusting the on time period of the switch M1 in each switching cycle.

The comparison result of the comparing signal Vcp and the switching control signal G1 reflects the status of the power represented by the feedback signal Vfb of the switching converter. In other embodiments, the falling edge of the comparing signal Vcp may be compared to the rising edge of the switching control signal G1, or the rising edge of the comparing signal Vcp maybe compared to the rising edge of the switching control signal G1, or the rising edge of the comparing signal Vcp maybe compared to the rising edge of the switching control signal, so as to generate the on time regulating signal.

In one embodiment, the on time regulator A5 may comprise a comparing circuit comparing the switching control signal G1 and the comparing signal Vcp, and a selecting circuit with three inputs (X3, −X4 and 0). The on time regulator A5 could be implemented in multiple ways. For example, the on time regulator A5 may be realized by hardware description language, e.g., Verilog language or VHDL (Very-High-Speed Integrated Circuit Hardware Description Language), to fulfill the aforementioned functions.

Figure 6:
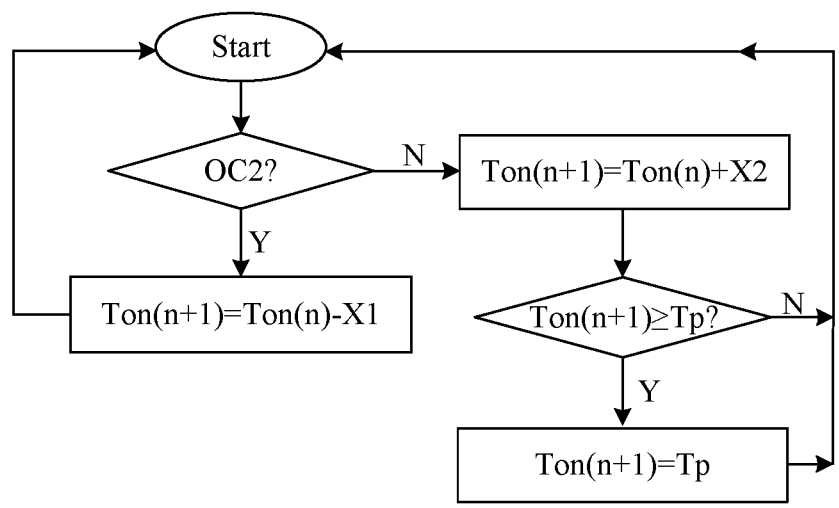
FIG. 6 shows steps of a method 60 of current protection, which may be applied to the switching converters, e.g., the buck converter 10 in FIG. 1.

FIG. 6 shows steps of a current protection method 60, which may be applied to the switching converters, e.g., the buck converter 10 in FIG. 1. The method 60 is similar to the method 40. Compared to the method 40, the method 60 doesn't comprise the step of operating the power device of the switching converter based on the block indicating signal OC1. The method 60 comprises: in the n-th switching cycle, comparing a current flowing through a power device, e.g., the switch M1 of the buck converter 10, with a limiting threshold Vth2 to generate a limit indicating signal OC2; setting the on time period Ton(n+1) of the power device be Ton(n+1)=Ton(n)−X1 when the limit indicating signal OC2 is valid, which indicates the current flowing through the power device is larger than the limiting threshold Vth2; setting the on time period Ton(n+1) of the power device be Ton(n+1)=Ton(n)+X2 when the limit indicating signal OC2 is invalid which indicates the current flowing through the power device is lower than the limiting threshold Vth2; and setting a maximum on time period Ton of the power device be an on time reference Tp.

Figure 7:
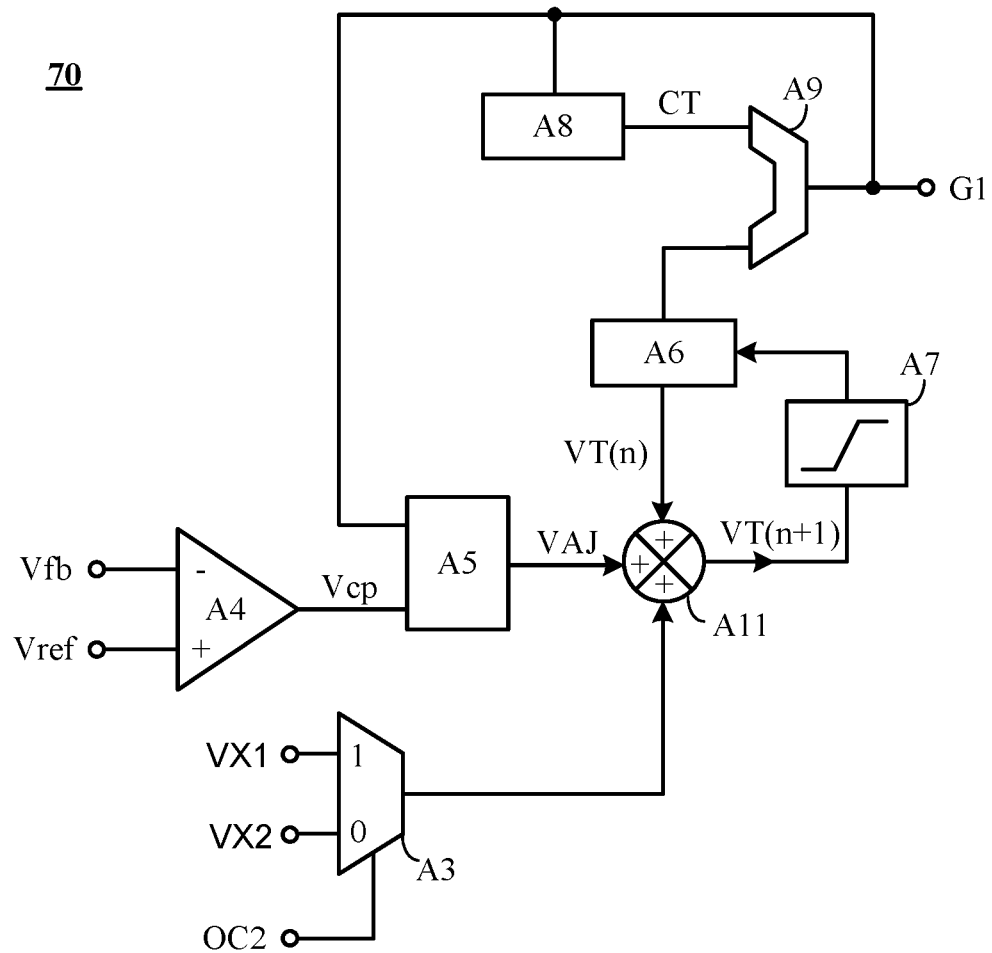
FIG. 7 schematically shows a current limiting circuit 70 in accordance with an embodiment of the present invention.

FIG. 7 schematically shows a current limiting circuit 70 in accordance with an embodiment of the present invention. The current limiting circuit 70 may be used with the switching converters, e.g., the buck converter 10 in FIG. 1. The current limiting circuit 70 comprises: a selecting circuit A3, configured to receive a first period signal VX1, a second period signal VX2 and the limit indicating signal OC2, and to provide the first period signal VX1 when the limit indicating signal OC2 is valid, and to provide the second period signal VX2 when the limit indicating signal OC2 is invalid; a timing circuit A8 configured to receive the switching control signal G1, and to provide a timing signal CT, wherein the timing signal CT is reset and begins timing from an initial value at the moment the switching control signal G1 turns on the switch M1; a summing circuit A11, configured to receive an on time signal VT(n) of the current switching cycle and the output signal of the selecting circuit A3, and to provide the summing result, i.e., a preset on time signal VT(n+1) of the next switching cycle; a clamping circuit A7 configured to receive the preset on time signal VT(n+1) of the next switching cycle provided by the summing circuit A11, and to provide the on time signal VT(n+1) of the next switching cycle when the on time period Ton (n+1) is lower than an on time reference Tp, and to provide the on time reference signal VTp when the on time period Ton(n+1) is larger than or equal to the on time reference Tp; a register A6, configured to receive and update the on time signal VT(n+1) in each switching cycle; and a digital comparator A9, configured to receive the timing signal CT, and to provide the switching control signal G1 based on a comparison result of the timing signal CT and the on time signal VT in the register A6.

The operation of the current limiting circuit 70 is similar to the operation of the current limiting circuit 50, and is not described herein for brevity.

The present invention could be applied to the switching converters with on time control. In the above embodiments, the switch M1 is turned off when the on time is up in each switching cycle. The switch M1 may be turned on by any known technology in the field. In one embodiment, the off time period of the switch M1 equals to the on time period of the switch M1, i.e., the duty cycle of the switch M1 is 50%. In that case, there may be an off time control circuit copying the on time period of the switch M1 so as to control the off time period and to determine the on operation of the switch M1.

buck converter is used as an example to illustrate the present invention. Persons of ordinary skill in the art should know that the present invention could be adopted in other switching converters, e.g., Boost converter, buck-boost converter, LLC converter, flyback converter.

The controlling of the main switch M1 of the buck converter is used as an example to illustrate the present invention. Persons or ordinary skill in the art should know that when the present invention is adopted in a different switching converter, the switch to be controlled may be different. For example, an on time period of a low side switch may be controlled by the present invention in a Boost converter to realize over current protection, while an on time period of a primary switch coupled to a transformer in a primary side maybe controlled by the present invention in a Flyback converter to realize over current protection.

Obviously many modifications and variations of the present invention are possible in light of the above teachings. It is therefore to be understood that within the scope of the appended claims the technology may be practiced otherwise than as specifically described. It should be understood, of course, the foregoing disclosure relates only to a preferred embodiment (or embodiments) of the technology and that numerous modifications may be made therein without departing from the spirit and the scope of the technology as set forth in the appended claims. Various modifications are contemplated and they obviously will be resorted to by those skilled in the art without departing from the spirit and the scope of the technology as hereinafter defined by the appended claims as only a preferred embodiment(s) thereof has been disclosed.

What is claimed is:

1. An over current protecting circuit, used with a switching converter having a switch, comprising:
    a current limiting circuit, configured to receive a limit indicating signal and to provide an on time signal to control an on time period of the switch based on the limit indicating signal, wherein if the limit indicating signal indicates a current flowing through the switch of the switching converter is larger than a limiting threshold, an on time period of the switch of a next switching cycle is decreased with a first period compared to an on time period of the switch of a current switching cycle, otherwise, the on time period of the switch of the next switching cycle is increased with a second period; and
    wherein a maximum on time period of the switch is fixed to be an on time reference; and
    wherein the current limiting circuit comprises:
        a selecting circuit, configured to receive a first period signal, a second period signal and the limit indicating signal, and to provide the first period signal when the limit indicating signal is valid, and to provide the second period signal otherwise;
        a timing circuit, configured to receive a switching control signal for controlling an on and off operation of the switch, and to provide a timing signal, wherein the timing signal is reset and begins timing from an initial value at a moment the switch is turned on;
        a summing circuit, configured to receive an on time signal of the current switching cycle and an output signal of the selecting circuit, and to provide the on time signal for the next switching cycle;
        a clamping circuit, configured to clamp a maximum on time signal to an on time reference signal;
        a register, configured to store and update the on time signal for every switching cycle; and
        a digital comparator, configured to receive the timing signal and the on time signal stored in the register, and to provide the switching control signal based on a comparison result of the timing signal and the on time signal stored in the register.

2. The over current protecting circuit of claim 1, further comprising:
    a current sensing circuit, configured to receive the limiting threshold and the current flowing through the switch, and to provide the limit indicating signal based on a comparison result of the limiting threshold and the current flowing through the switch.

3. The over current protecting circuit of claim 2, wherein the current sensing circuit is further configured to receive a blocking threshold, and further configured to provide a block indicating signal based on a comparison result of the blocking threshold and the current flowing through the switch.

4. The over current protecting circuit of claim 3, wherein current limiting circuit further comprises:
    a sampling circuit, configured to receive the timing signal and the block indicating signal, and to provide the timing signal to the register as the on time signal of the current switching cycle when the block indicating signal is valid.

5. The over current protecting circuit of claim 4, wherein the first period signal has a value of the first period, and the second period signal has a value of the second period, and wherein the first period is larger than the second period.

6. The over current protecting circuit of claim 1, wherein the first period signal has a value of the first period, and the second period signal has a value of the second period, and wherein the first period is larger than the second period.

7. A switching converter, converting power by turning on and off a switch, comprising:
    a comparing circuit, configured to receive a reference signal and a feedback signal indicative of an output power of the switching converter, and to generate a comparing signal based on a comparison result of the feedback signal and the reference signal;
    an on time regulator, configured to receive the comparing signal and a switching control signal turning on and off the switch, and to provide an on time regulating signal based on a comparison result of the switching control signal and the comparing signal; and
    an over current protecting circuit having a current limiting circuit configured to receive a limit indicating signal and to provide an on time signal to control an on time period of the switch based on the limit indicating signal, wherein if the limit indicating signal indicates a current flowing through the switch of the switching converter is larger than a limiting threshold, the on time period of the switch of a next switching cycle is decreased with a first period compared to an on time period of the switch of a current switching cycle, otherwise, an on time period of the switch of the next switching cycle is increased with a second period;
    wherein the on time regulating signal is added to the on time signal of the next switching cycle to control the on time period of the switch; and
    wherein a maximum on time period of the switch is fixed to be an on time reference.

8. The switching converter of claim 7, wherein:
    when the comparison result of the feedback signal and the reference signal indicates a decreasing output power of the switching converter, the on time regulating signal has a value of a third period;

when the comparison result of the feedback signal and the reference signal indicates a stable output voltage of the switching converter, the on time regulating signal has a value of zero; and when the comparison result of the feedback signal and the reference signal indicates an increasing output power of the switching converter, the on time regulating signal has a value of a negative fourth period.

9. The switching converter of claim 7, wherein the over current protecting circuit further comprises a current sensing circuit configured to receive the current flowing through the switch and the limiting threshold, and to provide the limit indicating signal based on a comparison result of the current flowing through the switch and the limiting threshold.

10. The switching converter of claim 9, wherein the current sensing circuit further receives a blocking threshold, and provides a block indicating signal based on a comparison result of the current flowing through the switch and the blocking threshold.

11. The switching converter of claim 7, wherein a first period signal has a value of the first period, and a second period signal has a value of the second period, and wherein the first period is larger than the second period.

12. An over current protecting method used with a switching converter having a power device, the method comprising:

decreasing an on time period of the power device of a current switching cycle by a first period to preset the on time period of the power device for a next switching cycle when a current flowing through the power device is larger than a limiting threshold;

increasing the on time period of the power device of the current switching cycle by a second period to preset the on time period of the power device for the next switching cycle when the current flowing through the power device is lower than the limiting threshold; and setting a maximum on time period of the power device in each switching cycle to be an on time reference;

wherein the switching converter is controlled by an on time control method which comprises:

generating a comparing signal based on comparing a feedback signal indicative of an output power of the switching converter with a reference signal; and regulating the on time period of the power device for the next switching cycle based on a comparison result of the comparing signal and a switching control signal turning on and off the power device; wherein:

increasing a preset on time period of the power device for the next switching cycle by a third period when the comparison result of the comparing signal and the switching control signal indicates a decrease of the output power of the switching converter;

keeping the preset on time period of the power device for the next switching cycle unchanged when the comparison result of the comparing signal and the switching control signal indicates a stable output power of the switching converter; and decreasing the preset on time period of the power device for the next switching cycle by a fourth period when the comparison result of the comparing signal and the switching control signal indicates an increase of the output power of the switching converter.

13. The over current protecting method of claim 12, further comprising:

turning off the power device when the current flowing through the power device increases to a blocking threshold; and increasing the on time period of the power device of the current switching cycle by the second period to preset the on time period of the power device for the next switching cycle when the current flowing through the power device is lower than the limiting threshold and the blocking threshold.

14. The over current protecting method of claim 13, wherein the blocking threshold is larger than the limiting threshold.

15. The over current protecting method of claim 12, wherein the first period is larger than the second period.

* * * * *